US008955008B2

(12) United States Patent
Wendling

(10) Patent No.: US 8,955,008 B2
(45) Date of Patent: Feb. 10, 2015

(54) TELEVISION DECODING UNIT WITH MULTIPLE WIRELESS ACCESS MODULES

(75) Inventor: Bertrand Wendling, Rolle (FR)

(73) Assignee: Nagravision S.A. (CH)

( * ) Notice: Subject to any disclaimer, the term of this patent is extended or adjusted under 35 U.S.C. 154(b) by 72 days.

(21) Appl. No.: 13/433,077

(22) Filed: Mar. 28, 2012

(65) Prior Publication Data
US 2012/0185893 A1 Jul. 19, 2012

Related U.S. Application Data

(63) Continuation-in-part of application No. PCT/EP2010/064522, filed on Sep. 30, 2010.

(30) Foreign Application Priority Data

Sep. 30, 2009 (EP) ..................................... 09171726

(51) Int. Cl.
*H04N 7/16* (2011.01)
*G06F 21/10* (2013.01)
(Continued)

(52) U.S. Cl.
CPC ................ *H04N 7/163* (2013.01); *G06F 21/10* (2013.01); *H04L 12/6418* (2013.01); *H04N 21/4126* (2013.01); *H04N 21/4181* (2013.01); *H04N 21/42684* (2013.01); *H04N 21/43637* (2013.01); *H04N 21/441* (2013.01); *H04N 21/44222* (2013.01); *H04N 21/4751* (2013.01); *H04N 21/4755* (2013.01); *G06F 2221/2137* (2013.01);
(Continued)

(58) Field of Classification Search
USPC .......................................... 725/22–30
See application file for complete search history.

(56) References Cited

U.S. PATENT DOCUMENTS 5,973,683 A 10/1999 Cragun et al.
8,198,988 B2 * 6/2012 Hardacker et al. .......... 340/12.51
(Continued)

FOREIGN PATENT DOCUMENTS

EP 1150506 A2 10/2001
EP 1530115 A2 5/2005
(Continued)

OTHER PUBLICATIONS

"EP Application No. 09171726.4, EP Search Report", (May 17, 2010), 7 pgs.
(Continued)

*Primary Examiner* — Pankaj Kumar
*Assistant Examiner* — Charles N Hicks
(74) *Attorney, Agent, or Firm* — Schwegman Lundberg & Woessner, P.A.

(57) ABSTRACT

The present invention proposes a system comprising a television decoding unit and a plurality of access modules, said access modules comprising wireless communication means with the television decoding unit, a memory comprising an identification of said module, said television decoding unit comprising means for detecting the presence and to receive the identification of an access module, means to apply a filter on events displayed on the television unit, said filter being defined with pre-defined filter category attached to the identification, and means to record the events consumption while the access module is detected by the television unit.

13 Claims, 1 Drawing Sheet

(51) Int. Cl.
*H04L 12/64* (2006.01)
*H04N 21/41* (2011.01)
*H04N 21/418* (2011.01)
*H04N 21/426* (2011.01)
*H04N 21/4363* (2011.01)
*H04N 21/441* (2011.01)
*H04N 21/442* (2011.01)
*H04N 21/475* (2011.01)
*H04L 29/06* (2006.01)

(52) U.S. Cl.
CPC ......... *G06F 2221/2149* (2013.01); *H04L 63/10* (2013.01)
USPC .................. 725/28; 725/22; 725/23; 725/24; 725/25; 725/26; 725/29; 725/30

(56) References Cited

U.S. PATENT DOCUMENTS

2005/0096753 A1  5/2005  Arling et al.
2006/0258289 A1* 11/2006  Dua .............................. 455/41.3
2008/0301737 A1* 12/2008  Hjelmeland Almas et al.  725/61
2009/0217336 A1  8/2009  Chang et al.

FOREIGN PATENT DOCUMENTS

WO    WO-2007072284 A2    6/2007
WO    WO-2007119125 A1    10/2007

OTHER PUBLICATIONS

"International Search Report and Written Opinion for PCT/EP2010/064522", (Feb. 11, 2011), 12 pgs.

* cited by examiner

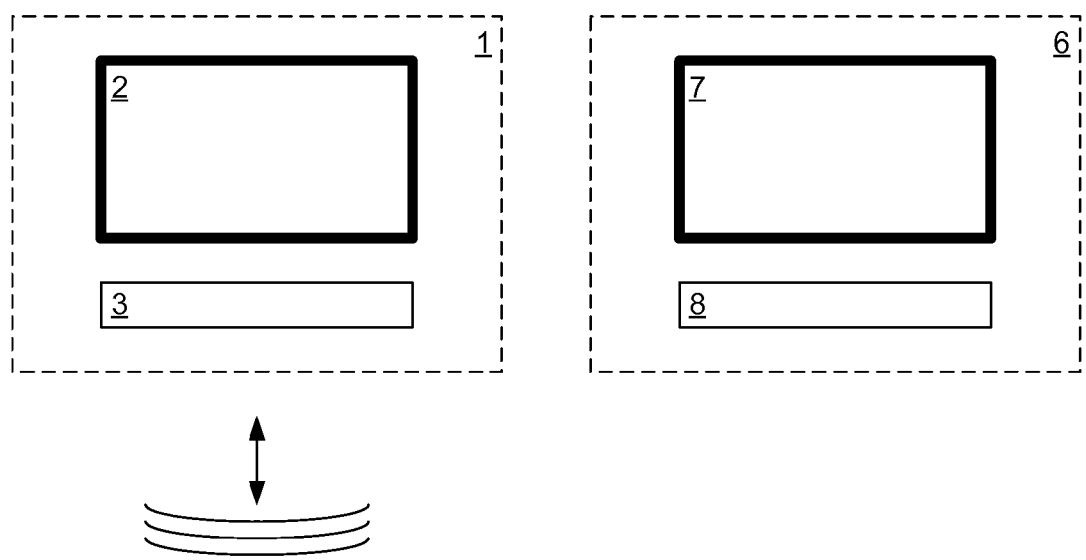
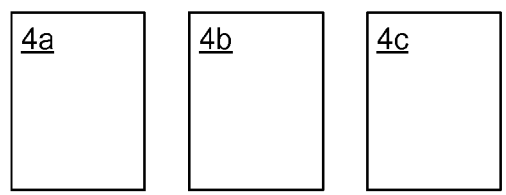

TELEVISION DECODING UNIT WITH MULTIPLE WIRELESS ACCESS MODULES

RELATED APPLICATIONS

This application is a nationalization filed under 35 U.S.C. §111(a) as a Continuation-in-Part of PCT Application serial no. PCT/EP2010/064522, filed on Sep. 30, 2010 and published on Apr. 7, 2011 as WO 2011/039294 A1, which claims the benefit of priority of EP Application serial no. 09171726.4, filed on Sep. 30, 2009, which applications and publication are incorporated herein by reference in their entirety.

INTRODUCTION

The present invention concerns the field of devices to identify users in a television decoding unit.

PRIOR ART

In television decoding units, it has been recognized as necessary to identify the user currently watching to decide which channels he is allowed to watch. The selection is made in accordance with the rating attached to each broadcast event. An event is flagged "adult" since content is limited to adult people. An example of the rating system can be found in the "TV Parental Guidelines" in the USA which defines various levels, according to the audience to which the event is directed.

Y: All Children

This program is designed to be appropriate for all children. Whether animated or live-action, the themes and elements in this program are specifically designed for a very young audience, including children from ages 2-6. This program is not expected to frighten younger children.

Y7: Directed to Older Children

This program is designed for children age 7 and above. It may be more appropriate for children who have acquired the developmental skills needed to distinguish between make-believe and reality. Themes and elements in this program may include mild fantasy violence or comedic violence, or may frighten children under the age of 7. Therefore, parents may wish to consider the suitability of this program for their very young children.

YZ FV: Directed to Older Children—Fantasy Violence

For those programs where fantasy violence may be more intense or more combative than other programs in this category, such programs will be designated TV-Y7-FV.

G: General Audience

Most parents would find this program suitable for all ages. Although this rating does not signify a program designed specifically for children, most parents may let younger children watch this program unattended. It contains little or no violence, no strong language and little or no sexual dialogue or situations.

PG: Parental Guidance Suggested

This program contains material that parents may find unsuitable for younger children. Many parents may want to watch it with their younger children. The theme itself may call for parental guidance and/or the program may contain one or more of the following: some suggestive dialogue (D), infrequent coarse language (L), some sexual situations (S), or moderate violence (V).

14: Parents Strongly Cautioned

This program contains some material that many parents would find unsuitable for children under 14 years of age. Parents are strongly urged to exercise greater care in monitoring this program and are cautioned against letting children under the age of 14 watch unattended. This program may contain one or more of the following: intensely suggestive dialogue (D), strong coarse language (L), intense sexual situations (S), or intense violence (V).

MA: Mature Audience Only

This program is specifically designed to be viewed by adults and therefore may be unsuitable for children under 17. This program may contain one or more of the following: crude indecent language (L), explicit sexual activity (S), or graphic violence (V).

The document WO 2001/80552A1 describes a way to organize the access to events according to the selected user. Each user has an access code which defines its ability to watch events or channels. In order to activate a personal profile, a pin code is entered that loads the data of said user in the filtering system. This filtering system extracts the parental data from a current broadcast event (or a recorded event if the television set comprises a storage device) and compares this rating with the rating defined in the current profile. In case that the level extracted from the event is higher than the pre-defined rating level, the display of the event is avoided.

This method relies on the introduction of a pin code for each user or group of users. Not only the enabling step is important, but also the disabling step, i.e. when a person entitled to high rating leaves the vicinity of the television unit.

In this case, the filtering system should return to the default value as quickly as possible to avoid a child accessing the events flagged to the high rating (i.e. adult, or violent) without control.

Also included in the prior art is a set of standards known as Near Field Communication or NFC. NFC is a set of standards covering communications protocols and data exchange formats based on an older set of standards for radio frequency identification (RFID) including ISO/IEC 14443. Standards for NFC include ISO/IEC 18092.

RFID is a wireless non-contact system using radio-frequency electromagnetic fields to transfer data from a so-called "tag" attached to an object. This has found use chiefly in tracking and inventory or asset management, which qualify as one-way communication applications. NFC on the other hand can be used to provide both one-way and two-way communication between terminals. In RFID the tag is passive in the sense that it needs to be interrogated rather than initialising a communication. It comprises a memory to store data and a small RF (radio frequency) transmitter and receiver. An RFID reader transmits a radio signal to interrogate the tag and the tag receives the signal and responds. In a system adapted to communicate according to an NFC standard, if one terminal is a reader and the other terminal is an un-powered tag, then the same function as performed by the RFID system can be realised. On the other hand, NFC allows for terminals to set up and perform two-way communication between them. Contactless transactions can be carried out between the terminals allowing for data exchange and for the set-up of more complex communications between the terminals. For example, an NFC exchange between two terminals may allow for a Wi-Fi connection to be set up between the terminals. In order to establish a radio communication between two terminals via NFC the terminals may either be touched together or simply brought into close proximity with one another, generally no more than a few centimeters.

Although NFC is quickly becoming available in many smartphones for example, the special problems encountered in the domain of conditional access enabled television require special solutions in order to take advantage of the possibilities afforded by NFC in such applications.

BRIEF DESCRIPTION OF THE INVENTION

In order to achieve this aim, the present invention proposes a system comprising a television decoding unit and a plurality of access modules, said access modules comprising wireless communication means with the television decoding unit, a memory comprising an identification of said module, said television decoding unit comprising means for detecting the presence and to receive the identification of an access module, means to apply a filter on events displayed on the television unit, said filter being defined with pre-defined filter category attached to the identification, and means to record the events consumption while the access module is detected by the television unit.

The present invention presents a wireless connection system between an access module and the television decoding unit. A plurality of access modules are known by the television decoding unit and detected according to the distance between the television decoding unit and the access module. More than one access module can be detected at the same time, and the television decoding unit can embed a priority function to decide which access module is to take into account. This can be achieved by the proximity of the access module or the rating level, the lower rating level being then applied to the filter means.

BRIEF DESCRIPTION OF THE FIGURES

The present invention will be better understood thanks to the attached FIGURE which describes the system of the invention, this system comprising a television decoding unit and a plurality of access modules.

DETAILED DESCRIPTION

As depicted in FIG. 1, the television decoding unit 1 could be in the form of a set-top box 3, attached to a screen 2. In other embodiment, a television screen comprises the various means of the invention. In yet another embodiment the television decoding unit could be in the form of a CAM directly connected to a suitable 30 interface in the screen. A screen is also known as a media display device. The television decoding unit extracts the services from the broadcast channels and displays the events of this channel. An event is a single program such as a film, a documentary or news. A rating level is attached to the identification data of the events and defines the type of audience (child, adult . . . ). In the same channel, different events can have a different rating level. It is also possible that a channel has all events flagged with a specific rating level. Also shown in FIG. 1 is a second television decoding unit 6 that may include a second set-top box 8 attached to a second screen 7. In one example, the second television decoding unit 6 may be located in a room separate from that in which the first television decoding unit 1 is located.

Upon starting up of the television unit, the wireless means seek the access modules 4a, 4b, 4c in range. If only one is found, the profile data of said access module, as identified by its identification data, will be applied. In case more than one access module is found, a selection will be done according to the policy previously decided. This policy can be set so that a "master" access module has priority over the other one.

According to another embodiment, the lower rating level is applied or a popup menu is displayed on the television to ask for the users selection.

By wireless transmission means, it is meant low range or high range of transmission.

The known standards are:
ISO 14223/1—Radio frequency identification of Animals, advanced transponders—Air interface
ISO/IEC 14443: This standard is a popular HF (13.56 MHz) standard for HighFIDs which is being used as the basis of RFID-enabled passports under ICAO 9303.
ISO 15693: This is also a popular HF (13.56 MHz) standard for HighFIDs widely used for non-contact smart payment and credit cards.
ISO/IEC 18000: Information technology—Radio frequency identification for item management:
ISO 18185: This is the industry standard for electronic seals or "e-seals" for tracking cargo containers using the 433 MHz and 2.4 GHz frequencies.
EPCglobal—this is the standardization framework that is most likely to undergo International Standardization according to ISO rules as with all sound standards in the world, unless residing with limited scope, as customs regulations, air-traffic regulations and others. Currently the big distributors and governmental customers are pushing EPC heavily as a standard well-accepted in their community, but not yet regarded as for salvation to the rest of the world.
ASTM D7434, Standard Test Method for Determining the Performance of Passive Radio Frequency Identification (RFID) Transponders on Palletized or Unitized Loads
ASTM D7435, Standard Test Method for Determining the Performance of Passive Radio Frequency Identification (RFID) Transponders on Loaded Containers Some wireless protocols (e.g. ISO 14443) are only suitable for low range detection, so that the wireless module has to be placed near the reader. Other protocols and technologies allow longer range up to 15 meters.

During an initialization step, each access module and their identification data are recorded into the television unit and associated with a user or a group of users (e.g. children or parents). An appropriate profile or account is created and a rating level is defined.

According to a first embodiment, the access module is a passive electronic tag such as a RFID tag. This module is only able to communicate an identifier which is related to a user by the television unit. This tag can be in the form of a sticker that is affixed to a personal device of the user such as his mobile phone, watch or personal computer.

According to a second embodiment, the access module is a control access module embodying the control access functions related to the Pay-TV, i.e. the reception of the control messages (ECM, EMM) carrying the keys to access the encrypted contents. The television unit extracts the control messages from the broadcast signal and send them to the control access module, these messages being decrypted and the keys allowing the decryption of the content are returned to the television unit. For that purpose, a bi-directional communication between the access module and the television unit is necessary. Such modules need energy to communicate with the television unit. This can be achieved by an internal battery or thanks to the proximity of the antenna of the television unit which produces magnetic waves that carry the data and the power to the access module. The active access module comprises an antenna that not only receives the transmitted data but also convert the magnetic waves into energy to power it.

In case the television unit is part of a home network, the initialization data are conveyed to the other television decoding units or shared within a network node. It is then possible to follow the user (or the access module) from a first room to another. When leaving the vicinity of the first television unit, the same detects the presence of another access module and applies this policy according to this access module. In the negative event, the television decoding unit returns in default mode.

In the other room, the profile data of the newly detected access module is loaded into the second television decoding unit and the rating attached to this profile is enforced.

According to an embodiment of the invention, when the television decoding unit no longer detects access modules, it switches into power down mode.

The access modules are initialized with a unique identification number generally set at the manufacture process. In other embodiment, the television decoding unit can program the identification number into the access module while the system is in a setting up phase.

The access modules can act as an authorization module and activate the related profile. However, according to the initialization step, an additional pin code can be requested once a specific access module is detected. This could be the case when the parent access module is detected within range; the television decoding unit requests the entering of a pin code before loading the parent profile.

The fact that the presence of a plurality of viewers is known by the television decoding unit opens other functionalities. It is now possible to define viewing policy in term of watching time per categories. Let's take the example that a child is allowed to watch for an equivalent of 50 units per day. The duration of one unit can be adjusted depending on the rating level or the category. The broadcast category "Y" will be defined as 1 unit per 10 minutes although the category "Y7" is defined as 5 units per 10 minutes. It is then possible to assign to each category a different weighting so that a user will consume its daily (or weekly) credit in a different speed in accordance with the type of broadcast. This will encourage users to spend more time to watch events at a low rating (having a low consumption speed) rather than watching level 3 (Directed to Older Children) that will decrease the credit more quickly. Instead of category, the same can be applied to channels. Some channels are fully dedicated to education such as Planet or Animals and can be weighted at a low consumption speed. Other channels such as Cartoon Network will be associated with a higher weight.

When more than one access module is detected in range, the rule applies to each user. As a consequence, one child will certainly try to hide his access module and watch the film on the account of the other one. In order to encourage each user watching the television to place the access module at a distance accessible by the television decoding unit, a reduction can be applied if more than one access module is detected. Lets take the example that the level 2 (Directed to Older Children) is charged 5 units per 10 minutes. If two users are detected, this rate will be reduced to 3 units per 10 minutes. This has the consequence that each user has an interest to share the television with another user to preserve his credit.

In an embodiment using access modules that are able to write data into their memory while in a wireless connection with the television unit; the access module can store the profile or other consumption information related to the broadcast currently used by the access module owner.

The access data to contents authorized or acquired by a user through its access module are stored within the access module. Once this access module is no longer in connection with the television unit, the latter stop to receive the decryption material and interrupt the display of such contents.

If the user with its access module moves from the vicinity of a first television unit to a second television unit, the second television unit will be able to resume the access to the content. In order to restore the same environment, the access module stores the last channel accessed by the first television unit, this information being read by the second television unit and allowing said unit to tune to the same channel.

The memory of the access module can act as a first-in first-out buffer for the channel watched by the user. Each time a channel change occurs, the channel identifier is sent to the access module. The new channel identifier received entails a push of the current channel identifier into the queue so that the new channel identifier is now on top of the list. When the list is full, the older channel identifier is deleted from the list.

Together with the channel identifier, a time information can be stored. This time could be the current time (day, hours, minutes) or the duration between the previous channel change.

Instead of storing the channel identifier into the access module, and in case a local network allows the communication between television units, the current channel of the selected access module is transferred from the first television unit to the second television unit.

In case that the broadcast system is able to suspend the broadcast to a first television unit and resume the same content, at the same timing position on the second television unit, an automatic suspend and buffering command is initiated while the access module leave the detection area of the first television unit. Once the second television unit has join the detection area of the second television unit for the detected the access module, a resume command is sent to the broadcast system that resume the display of the content at the same position as it was interrupted at the first television unit.

The same can be applied even if one television unit is considered, the temporary leave of the access module from the vicinity of the television unit automatically initiates a suspend function at the broadcast system. When the access module is again in range, the television unit sends a resume command to the broadcast system to continue the display of the content at the time it was interrupted.

According to another embodiment of the present invention, a television decoding unit is adapted to set up a communication channel with a suitable terminal. As previously mentioned, the television decoding unit may take any from a variety of forms, such as a set-top box attached to a media display device, a media display unit having the reception and decoding functions which would normally be in a set-top box already integrated therein or a media display unit with a slot for receiving a CAM to decrypt secure content. The essential feature, as in the other embodiments of the invention, is that it should be possible to detect the presence of the terminal with respect to the display unit. The telecommunications means which will allow for this detection to take place may therefore be located within any of the elements making up the television decoding unit, but depending on the way the television unit is configured, it could be practical to locate the telecommunications means within the media display unit.

A suitable terminal may be an electronic circuit comprising a storage area to store an identifier, preferably a unique identifier, reception/transmission means for making radio communication with the media display device and processing means for processing received information for example. The terminal may either be equipped with a battery via which it receives its power or it could be battery-less and the power is received via a transmission from the media display device.

The reception/transmission means is configured to function specifically over short distances in the order of up to around 10 cm. The terminal may take the form of a smartphone or a personal telephone or other mobile communication apparatus. Even a smartcard would do, as long as it has wireless communication means and storage means to store at least an identifier. A smartphone is well-suited as a terminal appropriate for use in this embodiment of the present invention.

Similarly to the previous embodiments of the present invention, this embodiment allows for communication to be set up between the television decoding unit and the terminal, especially when the decoding unit is attached to or comprised within the display unit, but in this case it is for short range only and according to an NFC standard. According to this embodiment, when a user with a terminal approaches the television decoding unit to within the required distance of several centimeters, or when the user touches his terminal against the television decoding unit, the communication will be established. As previously mentioned, the television decoding unit according to an embodiment of the present invention, may be integrated into the display device. In keeping with practices already known within the NFC domain, such a communication can be used to set up a more complex communication link between the terminal and the television decoding unit (display), such as a WiFi link. This has the advantage that the somewhat complex procedure of setting up the WiFi link is achieved in a user-friendly manner. Security is afforded by the fact that the terminal and the television decoding unit (display) have to be in very close proximity or even have to touch each other. Of course, for added security for the transfer of information once the communication has been established the usual encryption means may be used.

According to this embodiment it is then possible for one or more users, equipped with terminals allowing them to be uniquely identified from each other, to register their presence in the proximity of the display, either by tapping the terminal against the display or by placing the terminal sufficiently close to the display, and for the display to then take over the display functions which would otherwise be carried out on the terminal. Furthermore, using an appropriate data entry means, such as a user interface and a remote control input device, the user could interact with an application normally carried out on his terminal but at least temporarily shifted to the display for the length of time that his terminal is sufficiently close to the display.

For example, three users, each having a terminal in the form of a smartphone, register their presence in the proximity of a display by tapping the display with their smartphone. With the smartphone staying sufficiently close to the display while the three users are watching a film for example, one of the user's smartphones receives a text message. Thanks to the communication link set up between the smartphones and the display via NFS, the display can be made to show a small icon, personalised with respect to the user whose phone received the message, to show that a message has been received for that user. The user concerned could even reply to the message using a suitable graphic interface with a remote control device for the display, or even his own smartphone provided the smartphone remains sufficiently close to the display, to enter his reply.

In more general terms, the invention allows for the media display to become a multi-user (or single user) interface extension to (one or) a plurality of user terminals (smartphones), the interface functioning according to a set of pre-defined rules.

The smartphone may be configured to perform security functions as in a conditional access module for example, thus allowing the phone to be used to perform virtual purse functions. In this way a user may be able to pay for goods while he is watching an event promoting the particular goods since his smartphone will have the necessary credit information and personal identification including shipping address. The viewer may even use the virtual purse to pay for watching particular paying media content.

An embodiment of the present invention may be used in a voting application for example. In a system comprising the display unit and a plurality of terminals in the form of users' smartphones, the display and the phones being configured to perform communications according to an NFC standard, a voting system having reasonable security can be realised. In such a system, during the broadcast of an event, the viewers may be asked to vote for something—possibly on a subject that has something to do with the event being watched. For example, the viewers may be required to vote for one from a plurality of singers in a singing contest which is being shown on a broadcast being viewed on the display unit by the viewers. The vote is run from a management centre. Each viewer desiring to participate in the vote is required to download an application from the management to his terminal, allowing him to participate in the vote. The download can be done according to any of the known means such as by internet or by sending a message to the management centre via a back-channel as known in the pay-TV industry for example. For each application downloaded an anonymous certificate (in the case of an anonymous vote) is downloaded and stored on the user's terminal (phone). Each viewer's reply is associated with his personal identification, allowing the display to know that they are separate votes and each vote is accompanied by the certificate downloaded by the voter. This allows for the authenticity of the vote to be verified and makes sure that one voter cannot register multiple votes.

The invention claimed is:
1. A system comprising:
a television decoding unit configured to receive broadcast events, wherein the broadcast events are encrypted, and wherein the television decoding unit is configured to decrypt the broadcast events using at least one key;
a display unit configured to display the received broadcast events; and
a plurality of wireless access modules, wherein each of the wireless access modules comprises a wireless communicator and a memory comprising an identification of the module;
wherein the system further comprises a wireless communication unit configured to detect a presence of a wireless access module within a detection area, and to receive the identification of the wireless access module within the detection area, wherein the television decoding unit is further configured to apply a filter on broadcast events displayed on the display unit, wherein the filter is associated with a pre-defined filter category corresponding to the identification, and wherein the detection area is predetermined with respect to the display unit; and
wherein the wireless access module comprises a conditional access module configured to receive control messages related to the broadcast events, to decrypt the control messages, and to return the at least one key allowing the decryption of the broadcast events by the television decoding unit.

2. The system according to claim 1, wherein the display unit comprises the wireless communication unit.

3. The system according to claim 1, wherein the television decoding unit comprises the wireless communication unit and the television decoding unit is attached to the display unit.

4. The system according to claim 1, wherein the television decoding unit is further configured to enforce a viewing policy based on watching time.

5. The system according to claim 1, wherein the wireless access module comprises a passive electronic tag.

6. The system according to claim 1, wherein the wireless communication unit is further configured to detect simultaneously the presence of a plurality of access modules, and wherein the television decoding unit is further configured to elect one access module among the detected access modules according to predefined criteria, and to configure the filter with the pre-defined filter category corresponding to the elected access module.

7. The system according to claim 1, wherein the television decoding unit is configured to switch to a power-down mode when no access modules are detected.

8. The system according to claim 1, wherein the memory comprises an initial credit and a current credit pertaining to the detected access module, wherein the current credit represents watching units per time period, wherein the memory further comprises at least two weighting values representing watching units per unit time, wherein the first weighting value is applied while the television decoding unit is facilitating the display of broadcast events for a first category and the second weighting value is applied while the television decoding unit is facilitating the display of broadcast events for a second category, and wherein the television decoding unit is further configured to decrement the current credit according to the first of the second weighting values, to reload the current credit with the initial credit in response to the time period completing, and to interrupt the display of broadcast events when the current credit is depleted.

9. The system according to claim 1, wherein the television decoding unit comprises a first television decoding unit, wherein the system further comprises a second television decoding unit, wherein the first and second television decoding units are communicatively coupled to a broadcast system in charge of broadcasting the events, wherein the first television decoding unit is configured to send a suspend command to the broadcast system in response to the selected access module leaving the detection area of the first television decoding unit, and wherein the second television decoding unit is configured to send a resume command to the broadcast system in response to the selected access module joining the detection area of the second television decoding unit.

10. The system according to claim 1, wherein the television decoding unit comprises a first television decoding unit, wherein the system further comprises a second television decoding unit, wren the first and second television decoding units are communicatively coupled to a broadcast system in charge of broadcasting the events, wherein the first television decoding unit is configured to store a current channel broadcasted in response to the access module leaving the detection area of the first television decoding unit, wherein the second television decoding unit is configured to retrieve the current channel broadcasted while the access module is detected within the detection area of the second television decoding unit, and wherein the second television decoding unit is configured to read the current channel relating to the detected access module and to assign the current channel to the second television decoding unit.

11. The system according to claim 10, wherein the first and the second television decoding units are communicatively coupled to a local network, and wherein the current channel of the access module is transmitted from the first to the second television decoding unit via the local network.

12. The system according to claim 10, wherein the first and the second television decoding units are further configured to write data into the access module, wherein the first television decoding unit is configured to write the current channel into the access module, and wherein the second television decoding unit is configured to read the current channel from the access module.

13. The system according to claim 1, wherein the telecommunications means is configured to operate according to an ISO/IEC 18092 standard.

* * * * *

UNITED STATES PATENT AND TRADEMARK OFFICE
CERTIFICATE OF CORRECTION

| | | |
|---|---|---|
| PATENT NO. | : 8,955,008 B2 | Page 1 of 1 |
| APPLICATION NO. | : 13/433077 | |
| DATED | : February 10, 2015 | |
| INVENTOR(S) | : Bertrand Wendling | |

It is certified that error appears in the above-identified patent and that said Letters Patent is hereby corrected as shown below:

On the title page, item 30, in "Foreign Application Priority Data", in column 1, line 1, delete "09171726" and insert --09171726.4--, therefor In the claims In column 8, line 52 (Approx.), in Claim 1, before "wherein", insert --and--, therefor In column 10, line 12, in Claim 10, delete "wren" and insert --wherein--, therefor Signed and Sealed this
Twenty-eighth Day of June, 2016

Michelle K. Lee
*Director of the United States Patent and Trademark Office*